United States Patent

Kajuch et al.

(10) Patent No.: US 8,176,580 B2
(45) Date of Patent: May 15, 2012

(54) DIVERTER SPOUT

(75) Inventors: Pete Kajuch, Brookfield, WI (US);
Chad M. Slater, Osceola, WI (US)

(73) Assignee: Kohler Co., Kohler, WI (US)

( * ) Notice: Subject to any disclaimer, the term of this patent is extended or adjusted under 35 U.S.C. 154(b) by 961 days.

(21) Appl. No.: 12/167,372

(22) Filed: Jul. 3, 2008

(65) Prior Publication Data

US 2009/0019636 A1 Jan. 22, 2009

Related U.S. Application Data

(60) Provisional application No. 60/959,917, filed on Jul. 17, 2007.

(51) Int. Cl.
*E03C 1/04* (2006.01)
(52) U.S. Cl. .............................. 4/678; 137/467; 251/88
(58) Field of Classification Search .............. 4/678, 675; 137/359, 360, 801, 901, 625.48, 467; 251/264, 251/88, 272, 356, 367
See application file for complete search history.

(56) References Cited

U.S. PATENT DOCUMENTS

| 870,377 | A | * | 11/1907 | Marett | 137/630.16 |
|---|---|---|---|---|---|
| 1,145,252 | A | | 7/1915 | Matthews | |
| 2,663,539 | A | * | 12/1953 | Kersten et al. | 137/467 |
| 2,997,058 | A | * | 8/1961 | Hall | 137/360 |
| 3,238,965 | A | | 3/1966 | Masheder | |
| 3,387,816 | A | * | 6/1968 | Holycross | 251/175 |
| 3,538,953 | A | * | 11/1970 | Berger | 137/625.46 |
| 3,601,141 | A | | 8/1971 | Kishu | |
| 3,656,503 | A | | 4/1972 | Ward | |
| 3,709,254 | A | | 1/1973 | Wright | |
| 3,939,865 | A | * | 2/1976 | Nelson | 137/467 |
| 4,117,858 | A | * | 10/1978 | Bucknell et al. | 137/467 |
| 4,171,005 | A | * | 10/1979 | Nicklas | 137/467 |
| 4,182,373 | A | * | 1/1980 | Lewis | 137/625.44 |
| 5,109,887 | A | | 5/1992 | Saito et al. | |
| 5,226,453 | A | | 7/1993 | Biggers et al. | |
| 5,779,223 | A | * | 7/1998 | Marbach | 251/301 |
| 6,070,280 | A | | 6/2000 | Ko | |
| 6,449,784 | B1 | | 9/2002 | Pelletz | |
| 6,925,662 | B1 | | 8/2005 | Tan et al. | |
| 7,225,493 | B2 | * | 6/2007 | Hoofard et al. | 14/69.5 |

OTHER PUBLICATIONS

One page of engineering drawings depicting two admitted prior art types of diverter spouts, the upper spout being a Kohler spout, and the lower spout being from an unknown supplier.
PCT ISR for PCT/US2008/008305 dated Oct. 16, 2008.

* cited by examiner

*Primary Examiner* — Korie Chan
(74) *Attorney, Agent, or Firm* — Foley & Lardner LLP

(57) ABSTRACT

A diverter spout for alternatively supplying water to a bathtub or diverting water to a shower is provided with a rolling gate valve. The gate valve uses the force of flowing water to facilitate sealing, and there is a return spring to reset the gate valve.

14 Claims, 3 Drawing Sheets

DIVERTER SPOUT

CROSS-REFERENCE TO RELATED APPLICATION

This application claims priority based on U.S. provisional application 60/959,917 filed Jul. 17, 2007.

STATEMENT OF FEDERALLY SPONSORED RESEARCH OR DEVELOPMENT

Not applicable.

BACKGROUND OF THE INVENTION

The present invention relates to tub filler spouts suitable to control whether flow goes out the spout to fill a tub or alternatively is diverted to a shower outlet. More particularly it relates to compact diverter spouts that have manufacturing, aesthetic and operational advantages.

Conventional bathrooms typically have a filler spout that supplies water to a bathtub. In most of these installations a mixer control is positioned remote from the filler spout, usually on a wall. In some cases a diverter is directly mounted to the mixer control to select whether water is to flow to the tub or to the shower. In other cases the diverter is mounted on the filler spout itself. The present application relates to the second form of diverter.

With respect to this latter type of diverter, the diverter control can be placed adjacent the outlet of the spout. This has some cost advantages as the diverter would then not interfere with the connection between the spout and the room plumbing, and the outlet would be available to facilitate the assembly. However, there are some aesthetic concerns with respect to this location. Further, this location makes it more likely that something or someone will accidentally catch on the knob which controls the diverter.

Placing the diverter closer to the inlet may avoid or reduce these concerns. However, there are problems with respect to this approach as well.

For example, in U.S. Pat. No. 3,387,816 there was disclosed a diverter valve mounted near the inlet end of a tub filler spout. A lift knob was provided on the spout which connected to a shaft that passed through a small hole in the top rear of the spout. The other parts of the diverter were attached through the rear entry of the spout.

The valve included a sealing ring which, when moved vertically into alignment with an inlet conduit, sealed along a vertical surface. A problem with this design was that the water pressure was consistently acting against the seal (not assisting it), which placed greater demands on the seal, and which caused seal leakage (and thus lower shower flow and wasted tub water). This could also cause the diverter to accidentally drop down out of the diversion position from time to time when variable flow conditions were experienced (e.g. someone flushed a toilet which caused a pressure drop in the inlet line).

In U.S. Pat. No. 6,925,662 there was disclosed the idea of using a spring to facilitate movement of a tub diverter. However, water pressure was still acting laterally against a rubber ring which provided the sealing.

Other examples of prior art tub spouts where the diverter was mounted on the spout itself are U.S. Pat. Nos. 3,656,503, 6,070,280 and 6,449,784.

In unrelated work the art developed a variety of other valves which relied on ball-like structures to facilitate closure. See e.g. U.S. Pat. Nos. 1,145,252, 3,709,254, 5,109,887 and 5,226,453.

In any event, it is desired to develop further improved diverter spouts.

SUMMARY OF THE INVENTION

In one aspect the present invention provides a diverter spout for dividing fluid flow between two flow paths. The spout has a housing defining an internal flow channel with a restricted aperture therein, the aperture having an intake side and outlet side. There is also a carriage transversely movable across the restricted aperture, a linkage between the carriage and a control for causing the carriage to move relative to the aperture when desired, and a rollable gate mounted on the carriage. The gate can be caused to roll along a side of the aperture to thereby facilitate control of diversion of flow between the two flow paths if the spout is linked to a fluid supply and fluid is supplied to the spout.

In preferred forms the rollable gate can be caused to roll along the intake side of the aperture, the linkage can be a rod (e.g. a lift rod) passing through an upper wall of the spout housing and a knob mounted at an upper end of the rod outside the housing, and a resilient member can bias the carriage towards a position in which it is not completely closing off the aperture. This structure is particularly desirable where the diverter spout is a filler spout suitable to divide water flow between a bathtub when water passes through the spout and a shower outlet when the rollable gate restricts flow through the restricted aperture.

In other preferred forms the internal flow channel is an axial channel, an adaptor ring is provided at an intake end of the axial channel suitable to link an intake supply line to the spout, an axle is mounted on the carriage, and the rollable gate is mounted on the axle. The axle is mounted in slotted hub structures of the carriage so as to permit the axle to move towards and away from the aperture in a direction transverse to a direction of movement of the carriage.

Other refinements include that the rollable gate can be made of a resilient material such as rubber, the intake side of the aperture can include a chamfer forming a seat for the rollable gate, the housing can include an aerator at its outlet end, and the rollable gate can be in the form of a ball having a through passage for accepting an axle.

The present invention is highly advantageous. It provides an exterior appearance which only has minimal aesthetic disruption due to the control knob. Further, the control knob is rearwardly placed to avoid anything catching thereon.

The sealing assembly uses the flow of the water to assist in securing the seal, and can be easily assembled, largely through the rear of the spout. The overall design is susceptible to low cost manufacturing techniques, reducing the overall cost.

Yet other advantages include that the rolling action, taken together with the spring return pressure, reduces any tendency for the design to stick once diversion occurs. Further, the design of the hub slots and the use of a rolling mechanism should help insure reliability over long periods of use.

These and still other advantages of the present invention will become more apparent, and the invention will be better understood by reference to the following description of a preferred embodiment of the present invention taken in conjunction with the accompanying drawings.

DETAILED DESCRIPTION OF THE PREFERRED EMBODIMENT

Figure 1:
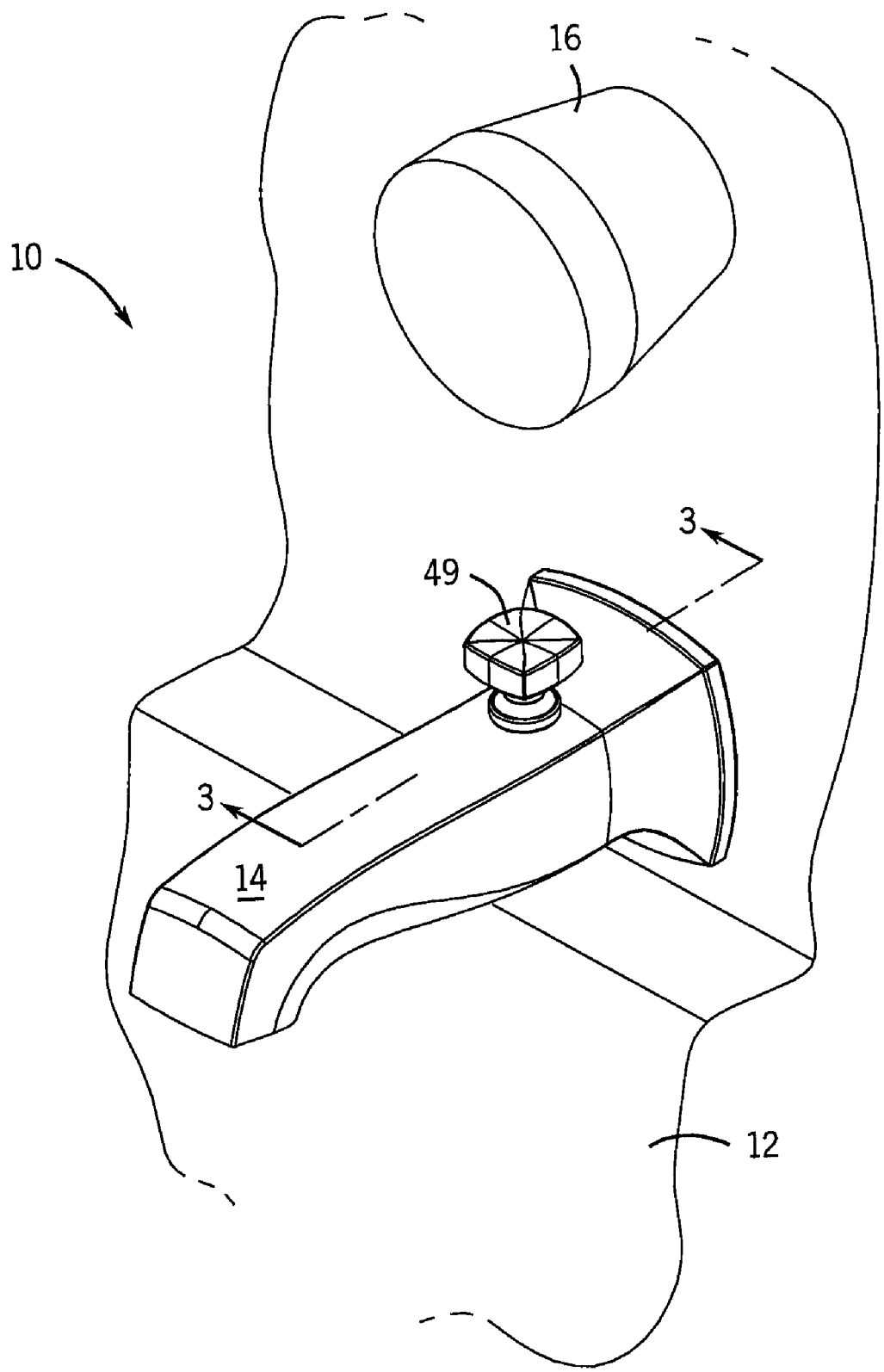
FIG. 1 is a perspective view of a preferred diverter spout of the present invention installed in a bathroom adjacent a tub and also a mixer control.

Referring first to FIG. 1, there is shown a bathroom generally 10 which includes a bathtub 12, a spout 14, and a wall mounted mixing valve 16 suitable to control flow to the spout 14. A shower outlet (not shown) may be mounted several feet above the filler spout 14.

A water supply line extends from the mixing valve 16 to an elbow (not shown) behind the wall adjacent the spout 14. One branch of the elbow continues to the spout. Another branch of the elbow leads up to the shower outlet. When flow through the spout is not blocked by the diverter, gravity will cause the water to prefer supplying the spout 14, with no water going to the shower. When an outlet of the spout 14 is blocked off by the diverter, water will follow the only open path and thus feed the shower.

Figure 2:
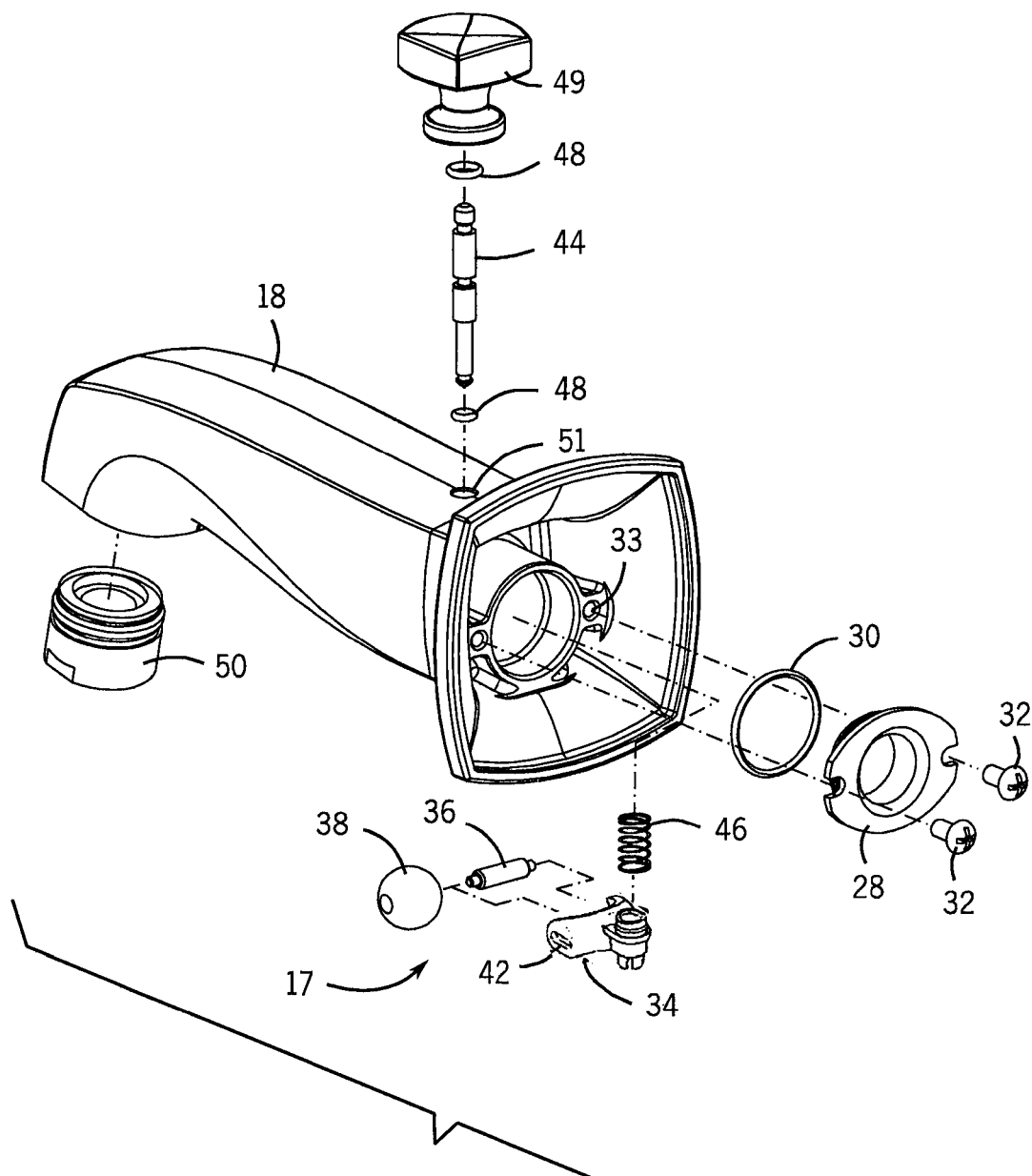
FIG. 2 is an exploded rear perspective view of the diverter spout of FIG. 1.
Figure 3:
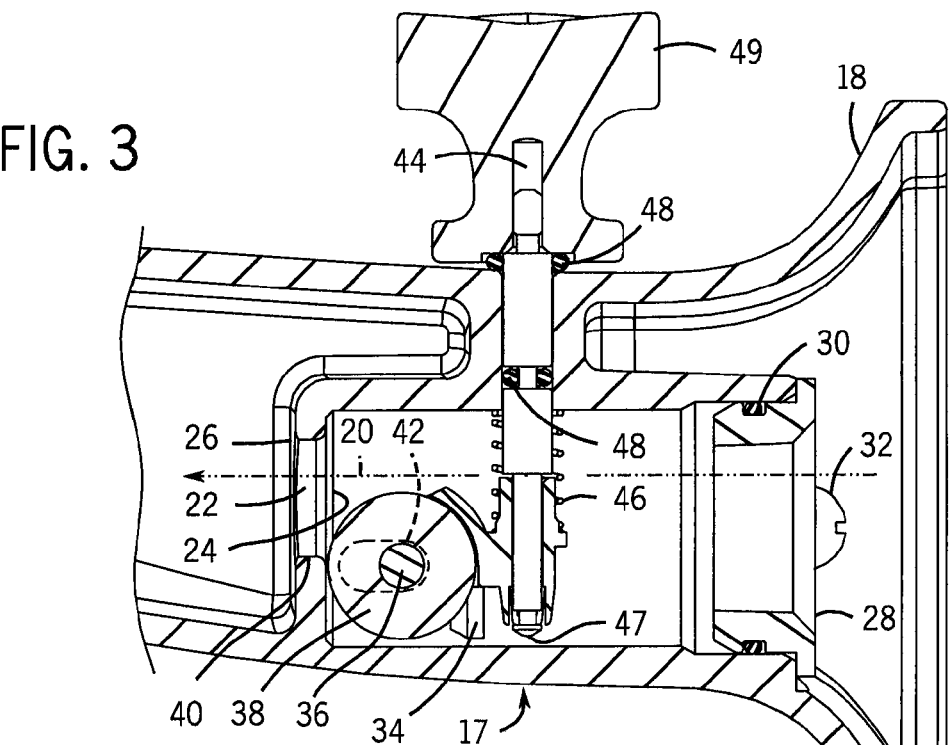
FIG. 3 is a sectional view taken along line 3-3 of FIG. 1.
Figure 4:
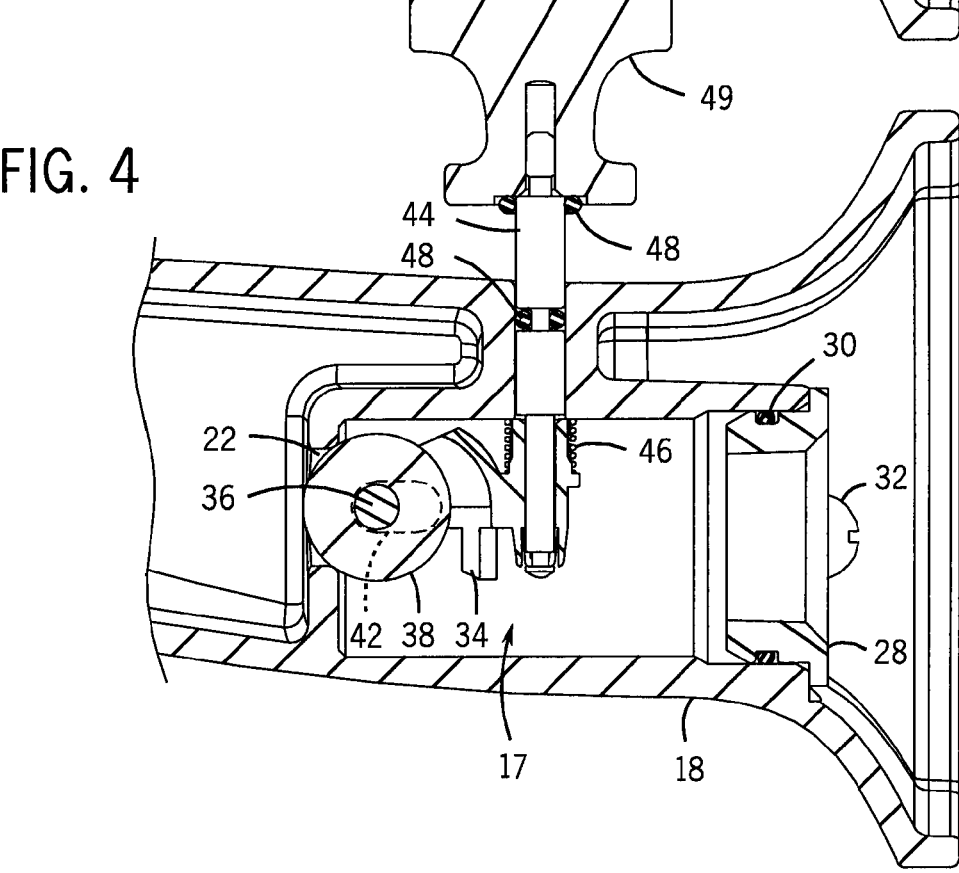
FIG. 4 is a view similar to FIG. 3, but showing the valve in a diversion position.

Referring now more particularly to FIGS. 2-4, spout 14 has a diverter valve (generally 17) and an outer housing 18 defining a flow channel 20. Flow through the flow channel 20, and thus out the spout 14, requires passage through a restricted aperture 22 which has an intake side 24 and outlet side 26. There may also be a conventional aerator 50 threaded into receiving threads (not shown) at the outlet.

An adaptor ring 28 is bolted via fasteners 32 to the holes 33, with an o-ring 30 helping provide a better seal. The adaptor ring then receives the supply pipe.

There is a vertically movable carriage 34 associated with intake side 24 of the restricted aperture 22. An axle 36 is mounted to carriage 34 and a rollable ball gate 38 rolls on the axle 36 somewhat like a wheel rolling on the ground.

Rollable ball gate 38 can be at least partially spherical, as is shown, or have other curvatures. Further, rollable ball gate 38 is preferably comprised of a resilient material, such as rubber.

Carriage 34 and rollable ball gate 38 are vertically displaceable between a closed position (FIG. 4) in which gate 38 seals and covers restricted aperture 22, and an open position (FIG. 3) wherein at least a portion of restricted aperture 22 is unobstructed by gate 38. In the closed position, the fluid source, typically water provides a water force which acts on gate 38 to drive it against a perimeter chamfer 40 on intake side 24.

Rollable ball gate 38 rotates on axle 36 as it is linearly displaced between the closed and open position. Carriage 34 includes two slotted hubs 42 in which respective ends of axle 36 are positioned transverse to the linear up and down (closing and opening) motion of carriage 34. When carriage 34 is moved into the closed position, slotted hubs 42 allow axle 36 and rollable ball gate 38, which are acted on by the water pressure, to move transversely towards perimeter chamfer 40 on intake side 24 to better seat and seal gate 38 against chamfer 40. There is reduced friction between intake side 24 and ball gate 38, and also reduced attendant wear associated therewith, as a result of these structures.

The carriage may be caused to move by a manual lifting of knob 49. Knob 49 is linked to rod 44, which in turn links at its lower end to an acceptor 46 on the carriage. A bolt or other fastener 47 retains the rod 44 in the carriage acceptor 46. The lower o-ring 48 is provided to prevent leakage up through the top of the spout hole 51. The upper o-ring is primarily present as a bumper.

Note that the carriage is preferably installed first before the rod 44. As a result, the parts can be made to snap together.

Modifications and variations to the preferred embodiment will be apparent to those skilled in the art, which are intended to be within the spirit and scope of the invention. For example, while an embodiment that is manually activatable is shown, it should be appreciated that electrical, hydraulic, pneumatic or other control systems can be used to move the rod 44. In another example, the spout need not be for a residential bathtub. Rather, it could be a filler for another type of system requiring a diversion capability (e.g. an industrial vat with a by-pass option).

Therefore, the present invention is not to be limited to just the described most preferred embodiment. Hence, to ascertain the full scope of the invention, the claims which follow should be referenced.

INDUSTRIAL APPLICABILITY

The invention provides diverter spouts, particularly those suitable for controlling flow between bathtubs and showers.

We claim:

1. A diverter spout for dividing fluid flow between two flow paths, the spout comprising:
   a housing defining an internal flow channel with a restricted aperture therein, said aperture having an intake side and outlet side;
   a carriage transversely movable across said restricted aperture;
   a linkage between the carriage and a control for causing the carriage to move relative thereto when desired; and
   a rollable gate mounted on the carriage;
   whereby the rollable gate can be caused to roll along a side of the aperture to thereby facilitate control of diversion of flow between the two flow paths if the spout is linked to a fluid supply and fluid is supplied to the spout;
   wherein an axle is mounted on the carriage, and the rollable gate is, rollably mounted on the axle; and
   wherein the axle is mounted in slotted hub structures of the carriage so as to permit the axle to move towards and away from the aperture in a direction transverse to a direction of movement of the carriage.

2. The diverter spout of claim 1, wherein the linkage comprises a rod passing through an upper wall of the housing and a knob mounted at an upper end of the rod outside the housing.

3. The diverter spout of claim 2, wherein a resilient member biases the carriage towards a position in which it is not completely closing off the aperture.

4. The diverter spout of claim 1, wherein the diverter spout is a filler spout suitable to divide water flow between a bathtub when water passes through the spout and a shower outlet when the rollable gate restricts flow through the aperture.

5. The diverter spout of claim 1, wherein the internal flow channel is an axial channel and an adaptor ring is provided at an intake end of the axial channel suitable to link an intake supply line to the spout.

6. The diverter spout of claim 1, wherein said rollable gate is comprised of a resilient material.

7. The diverter spout of claim 6, wherein the rollable gate is formed of a rubber.

8. The diverter spout of claim 1, wherein said intake side of the aperture includes a chamfer forming a seat for the rollable gate.

9. The diverter spout of claim 1, wherein the rollable gate is in a form of a ball having a through passage for accepting an axle.

10. The diverter spout of claim 1, wherein said housing includes an aerator at its outlet end.

11. The diverter spout of claim 1, wherein the rollable gate can be caused to roll along the intake side of the aperture.

12. The diverter spout of claim 1, wherein the carriage is located on the intake side of the aperture.

13. The diverter spout of claim 1, wherein the slotted hub structures extend in a direction that is substantially parallel to an axis of the internal flow channel.

14. The diverter spout of claim 1, wherein the carriage comprises an open position and a closed position, and wherein the slotted hub structures are configured such that, when the carriage is in the closed position, the rollable gate moves towards the restricted aperture in response to fluid flow through the internal flow channel.

* * * * *